(12) United States Patent
McDonald et al.

(10) Patent No.: US 11,656,636 B1
(45) Date of Patent: May 23, 2023

(54) AUGMENTED AERIAL SORTATION

(71) Applicant: Amazon Technologies, Inc., Seattle, WA (US)

(72) Inventors: Gabriel McDonald, Somerville, MA (US); Sowmya Shankar, Wilmington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 16/938,255

(22) Filed: Jul. 24, 2020

(51) Int. Cl.
| | |
|---|---|
| *G06Q 50/28* | (2012.01) |
| *B64C 39/02* | (2023.01) |
| *G05D 1/00* | (2006.01) |
| *G08C 17/02* | (2006.01) |
| *G05D 1/10* | (2006.01) |

(Continued)

(52) U.S. Cl.
CPC .......... *G05D 1/104* (2013.01); *B64C 39/024* (2013.01); *G05D 1/0027* (2013.01); *G05D 1/0094* (2013.01); *G06Q 50/28* (2013.01); *G08C 17/02* (2013.01); *B64U 2101/60* (2023.01); *B64U 2201/20* (2023.01); *G06Q 50/265* (2013.01)

(58) Field of Classification Search
CPC .... G05D 1/104; G05D 1/0027; G05D 1/0094; B64C 39/024; B64C 2201/128; B64C 2201/146; G06Q 50/28; G06Q 50/265; G08C 17/02
See application file for complete search history.

(56) References Cited

U.S. PATENT DOCUMENTS

| | | | |
|---|---|---|---|
| 11,124,401 B1 * | 9/2021 | Jarvis | G05D 1/0234 |
| 11,392,122 B2 * | 7/2022 | Patnaik | G08G 1/096725 |

(Continued)

FOREIGN PATENT DOCUMENTS

| | | | | |
|---|---|---|---|---|
| CA | 3066261 A1 * | 6/2020 | | B60P 1/00 |
| CA | 3010965 C  * | 7/2020 | | B61B 13/10 |

(Continued)

OTHER PUBLICATIONS

Post & Parcel, "Pilot For Drone-Based Sorting Centre," Sep. 20, 2016 Accessed Online https://postandparcel.info/75531/news/pilot-for-drone-based-sorting-centre/.

(Continued)

*Primary Examiner* — Yonel Beaulieu
(74) *Attorney, Agent, or Firm* — Eversheds Sutherland (US) LLP

(57) ABSTRACT

Embodiments herein describe a combined aerial and ground sortation system. That is, the system can include both an aerial sortation system and a ground sortation system that work together to sort items (e.g., packages) in a warehouse or building. In one embodiment, the combined aerial and ground sortation system includes a leading sorter that identifies which packages should be sorted using the aerial sortation system and which should be sorted by the ground sortation system. The aerial sortation system may use drones to fly the package to one of the containers and drop the package into the container while the ground sortation system may use drive units that move along a floor of the warehouse to deposit the packages into the container. In another embodiment, the aerial sortation system performs a first, primary sort of the items while the ground sortation system performs a secondary sort.

17 Claims, 8 Drawing Sheets

(51) Int. Cl.
 *G06Q 50/26* (2012.01)
 *B64U 101/60* (2023.01)

(56) References Cited

U.S. PATENT DOCUMENTS

2021/0261348 A1 * 8/2021 Quaglia ................ B65G 21/14
2022/0100851 A1 * 3/2022 Mehrotra .............. G06F 21/554

FOREIGN PATENT DOCUMENTS

| EP | 3375735 A1 | * | 9/2018 | ................ B25J 5/02 |
| GB | 2588108 A | * | 4/2021 | ................ B65G 1/02 |
| WO | WO-2017190026 A2 | * | 11/2017 | ................ B60P 3/11 |
| WO | WO-2021021427 A1 | * | 2/2021 | ............ B60W 30/06 |

OTHER PUBLICATIONS

Amazon News, "Amazon's Newest Robots Mean New Jobs," YouTube, Jun. 5, 2019 <https://www.youtube.com/watch?v=4MH7LSLK8Dk>.

* cited by examiner

AUGMENTED AERIAL SORTATION

BACKGROUND

The present invention relates to combining aerial and ground sortation systems.

Currently, many warehouse sortation systems rely on ground based sortation where conveyors, associates, or autonomous vehicles transport items to different locations in the warehouse (e.g., different containers or locations). As a result, sorting the items is limited to the space provided by the floor of the warehouse. For example, an associate or autonomous vehicle must often navigate through narrow aisles and chock points that experience significant portions of traffic. These physical limitations restrict the throughput of the sortation process. Without additional space to maneuver, adding more associates or autonomous vehicles to the sortation process has limited effect on its throughput.

BRIEF DESCRIPTION OF DRAWINGS

Various embodiments in accordance with the present disclosure will be described with reference to the drawings, where like designations denote like elements.

DETAILED DESCRIPTION

Embodiments herein describe a combined aerial and ground sortation system. That is, the system can include both an aerial sortation system and a ground sortation system that work together to sort items (e.g., packages) in a warehouse or building. As discussed above, a ground sortation system that relies on conveyors, associates, or autonomous vehicles (e.g., drive units) to move packages through the warehouse is limited by the floor space of the warehouse. However, an aerial sortation system that includes drones can move in the space above the floor thereby changing the sortation process from a 2D process, which is limited to the space on the floor, to a 3D process that includes the total volume of the warehouse. The throughput of the sortation process can increase dramatically since the sortation process is no longer limited to a 2D space.

In one embodiment, the combined aerial and ground sortation system includes a leading sorter that identifies which packages should be sorted using the aerial sortation system and which should be sorted by the ground sortation system. For example, the leading sorter may use the weight, size, aerodynamic properties, packaging type, and the like to determine whether the package should be sorted using the aerial or ground sortation system. Further, the aerial and ground sortation systems may sort the packages to the same containers or locations, where each container or location corresponds to a specific geographic area such as a zip code, another warehouse, delivery route, etc. For example, the aerial sortation system may use drones to fly the package to one of the containers and drop the package into the container while the ground sortation system may use drive units that move along a floor of the warehouse until reaching one of the containers and eject the package into the container. Because the drive units operate on the floor while the drones operate in the airspace above the floor, the aerial and ground sortation systems can work seamlessly together to sort packages to the same (shared) containers or locations.

In another embodiment, the aerial sortation system performs a first (e.g., primary) sort of the items while the ground sortation system performs a second (e.g., secondary) sort. In this combined aerial and ground sortation system, the drones of the aerial sortation system may fly the packages to different containers and drop the items into a container corresponding to the item's destination. Once a container is full, the drive units in the ground sortation system can retrieve the full container and move it to a desired shipping location. The drive units can also move a new, empty container into the position vacated by the full container. In this manner, the aerial performs a first sort by moving packages into one of a plurality of containers while the ground sortation system performs a second sort by moving full containers to designated shipping locations.

Figure 1:
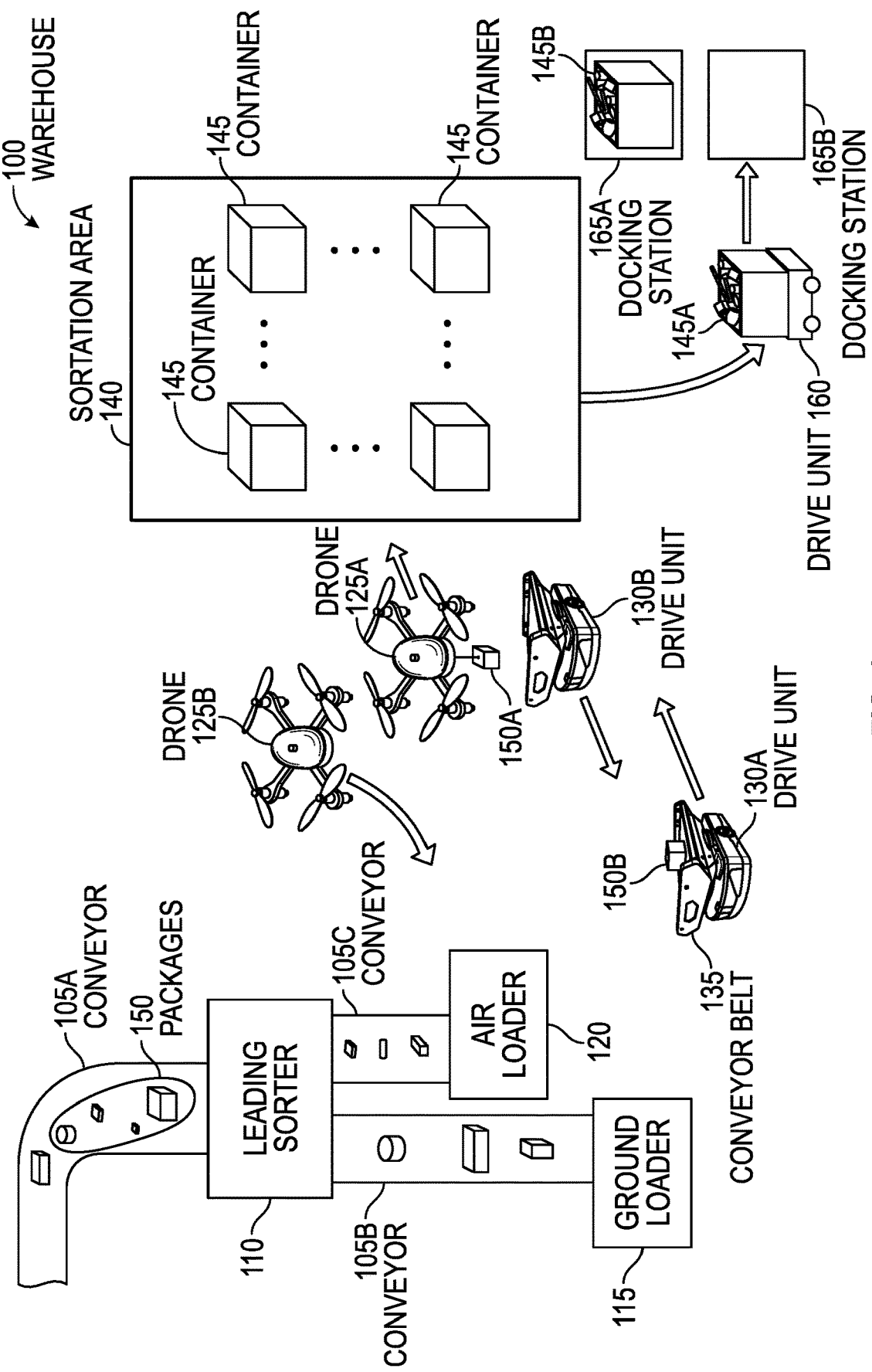
FIG. 1 illustrates a combined aerial and ground sortation system, according to one embodiment described herein.

FIG. 1 illustrates a combined aerial and ground sortation system in a warehouse 100, according to one embodiment described herein. As shown, the warehouse 100 includes a conveyor 105A (e.g., a conveyor belt or a plurality of powered rollers) for receiving packages 150 that are sorted into containers 145 in a sortation area 140. The packages 150 may have different weights, sizes, textures, etc. which determine whether the packages 150 are sorted by an aerial sortation system that includes drones 125 or a ground sortation system that includes drive units 130. To determine which system sorts the packages 150, the warehouse 100 includes a leading sorter 110 that performs an initial (or coarse) sort of the packages 150. The leading sorter 110 can include scales, package scanners, barcode readers and the like for identifying different physical characteristics of the incoming packages 150 such as weight, dimensions, texture of outer surface, and the like. For example, packages 150 with a weight above a threshold may be sorted by the ground sortation system, while packages 150 with weights below the threshold are sorted using the aerial sortation system. Further, even if packages 150 have weights below the threshold, the leading sorter 110 may route these packages to the ground sortation system if one or more dimensions of the package is too large (e.g., above a threshold) or based on the shape of the package (e.g., a cube rather than an envelope). The texture of the package 150 may also affect whether it is sorted by the drones 125 or the drive units 130.

In one embodiment, rather than determining the physical characteristics of each package 150 using the leading sorter 110, these characteristics may have been identified previously, e.g., when items were placed in the packages 150. In that scenario, the leading sorter 110 may use a barcode or image scanner to identify the package 150 and then retrieve its previously determining physical characteristics from a database.

After deciding which sortation system should receive the package 150, the leading sorter 110 can include any number of mechanical actuators for routing the packages 150 accordingly. For example, the leading sorter 110 can include pushers, pneumatic systems, slides, robotic arms, and the like for placing the packages 150 on either a conveyor 105B that guides packages 150 to a ground loader 115 or a conveyor 150C that guides the packages 150 to an air loader 120.

The ground loader 115 includes a mechanical system for loading packages 150 received on the conveyor 105B onto the drive units 130, while the air loader 120 includes a mechanical system for loading package 150 received using the conveyor 105C onto the drones 125. In one embodiment, the air loader 120 and the ground loader 115 detect when packages are successfully loaded onto the drones 125 or the drive units 130 without human intervention. In addition to loading the packages 150 on the drones 125 and drive units 130, the ground and air loaders 115, 120 can include charging stations or ports for charging batteries or super capacitors on the drones 125 and drive units 130.

In one embodiment, the drive units 130 includes a conveyor belt 135 for receiving and depositing (e.g., ejecting) the packages 150 into the containers 145 in the sortation area 140. For example, to load a package 150, the ground loader 115 may use a conveyor belt or other actuator to move a package 150 onto the conveyor belt 135 of the drive unit 130. In parallel, the drive unit 130 can activate the conveyor belt 135 to move the package 150 to a stable location on the unit 130 (e.g., a center of the conveyor belt 135). However, the drive units 130 can use other means such as powered rollers or robotic arms to move packages 150 onto, and move packages off, the drive units 130.

The drones 125 can include clasps, baskets, electromagnetic holders, and the like for carrying packages 150. For example, the drones 125 may land, or hover over, the air loader 120 which attaches a package to a clasp or loads a package into a basket. The drone 125 can then release the clasp or tip the basket to unload the package.

In one embodiment, the drones 125 and drive units 130 are autonomous vehicles which can be steered or flown using central controllers, local controllers, or a mix of both. That is, the combined aerial and ground sortation system can use control systems (which can have centralized and local components) for navigating the drones 125 and drive units 130 through the warehouse 100 and loading/unloading the packages 150. For example, the control system for the aerial sortation system may include a movement planning system with knowledge of the size of the drone and the size of the package, and makes intelligent path planning when a drone is laden to avoid hitting obstacles or other drones. A similar movement planning system can be used by the ground sortation system to ensure the drive units can navigate the floor without colliding with other drive units or obstacles.

In one embodiment, a central controller for the aerial sortation system communicates with a central controller for the ground sortation system in order to synchronize actions between the drones 125 and the drive units 130. However, in other embodiments, the aerial and ground sortation systems may operate independently of each other. That is, these systems may be designed so that the aerial sortation system can be added to an existing ground sortation system without requiring any operational or functional changes to the operation of the ground sortation system.

In FIG. 1, the drones 125 and drive units 130 move the packages from the respective loaders 115, 120 to the containers 145 in the sortation area 140. The containers 145 may be boxes, gaylords, bins, shelves, and the like. In one embodiment, the containers 145 may be recessed in the floor so that the drive units 130 and drones 125 can both deposit packages 150 into the containers. In another embodiment, there may be ramps up to the containers 145 which the drive units 130 can climb in order to deposit the packages 150 into the containers 145. In yet another embodiment, there may be elevators on the sides of the containers 145 on which the drive units 130 deposit the packages 150. The elevators can then lift up the packages 150 so they can be deposited into the raised containers 145. In any case, the drones 125 and the drive units 130 can sort the packages 150 into the same share containers 145. However, in another embodiment, they may sort the packages 150 into different containers 145. For example, a subset of the containers 145 may be designed to receive packages 150 transported by the drive units 130 while another subset is designed to receive packages transported by the drones 125.

In FIG. 1, the drive unit 130A has received a package 150B from the ground loader 115 and is transporting the package 150B to a corresponding container 145. A control system may instruct the drive unit 130A where to deposit the package 150B based on a final or intermediate destination of the package 150B—e.g., a zip code, city, delivery route, a different warehouse, etc. The drive unit 130B, on the other hand, is returning to the ground loader 115 to retrieve a different package after previously depositing a package into a container 145 in the sortation area 140. Similarly, the drone 125A is carrying a package 150A from the air loader 120 to one of the containers 145 using an intermediate or final destination of the package 150A. While FIG. 1 illustrates the drone 125A and the drive unit 130A carrying single packages, in other embodiments, each of these vehicles may carry multiple packages that are deposited in the same container 145 or multiple containers 145. On the other hand, the drone 125B is returning to the air loader 120 from the sortation area 140 to retrieve another package (or packages). As used herein, a vehicle that is currently carrying a package 150 or item for sortation is referred to as a laden vehicle, while a vehicle without a package is an unladen vehicle.

The combined aerial and ground sortation system also includes drive units 160 that move the containers 145 from the sortation area 140 to docking stations 165. The docking stations 165 are locations where the containers 145 (and the packages therein) can be retrieved and removed from the warehouse 100. For example, the packages 150 may be loaded onto a truck or retrieved by a delivery person to be delivered to a customer. The drive units 160 may also move empty containers 145 into the sortation area 140 to replace the full containers 145 that have been removed. In other embodiments, instead of using autonomous drive units 160 to move the containers 145 into and out of the sortation area 140, associates may move the containers using a hand truck or forklift.

In embodiments discussed below, instead of the drones 125 and the drive units 130 sorting packages into the containers 145, only the drones 125 may move the packages 150 into the sortation area 140. In that scenario, the leading sorter 110 could be omitted since all the packages 150 would be delivered by the drones 125. However, the drive units 160 could still be used to perform another (secondary) sort by moving the containers to their designated docking stations 165.

While FIG. 1 illustrates using autonomous drive units 130 for transporting packages in the ground sortation system, in other embodiments, the warehouse 100 may use human operated vehicles or a system of conveyors (e.g., conveyor belts or powered rollers) to sort the packages 150. For example, an associate may pick up one or more items using a fork lift, hand truck, etc. and move the items to sortation area 140 to deposit the items in their corresponding containers 145 as discussed above. If conveyors are instead used, the conveyor can include actuators such as pushers, slides, or pneumatic systems to route packages from the ground loader 115 to the containers 145.

Figure 2:
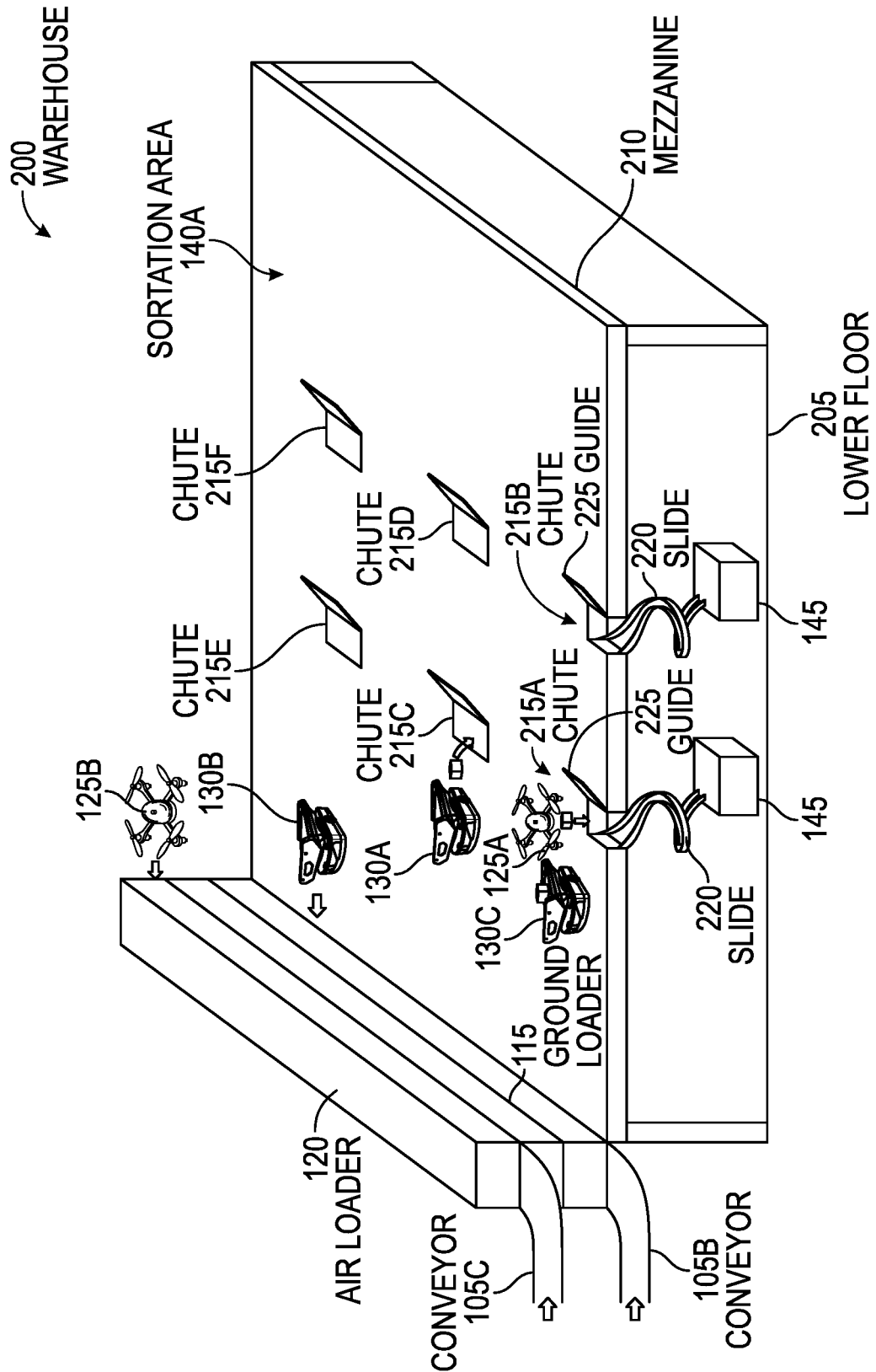
FIG. 2 illustrates a combined aerial and ground sortation system, according to one embodiment described herein.

FIG. 2 illustrates a combined aerial and ground sortation system in a warehouse 200, according to one embodiment described herein. The warehouse 200 includes a lower floor 205 on which a mezzanine 210 is supported. The raise mezzanine 210 provides a surface that the drive units 130 can use to sort packages into multiple chutes 215 in the mezzanine 210. FIG. 2 illustrates a side view of the mezzanine 210 so that the structures beneath the chutes 215A and 215B are visible. As shown, spiral slides 220 are coupled at a top end to the chutes 215A and 215B while the bottom ends of the slides 220 terminate at respective containers 145. As shown, the drive unit 130A is depositing a package 150 into the chute 215C. That package 150 then travels down the spiral slide (not shown) underneath the chute 215C until being deposited into a container. Providing the raised mezzanine 210 results in being able to recess the containers beneath the drive units 130 which makes it easier for the drive units 130 to deposit packages into the containers 145. Further, while slides are shown, they are not necessary and the drive units 130 could deposit the packages through the chutes 215 and directly into the containers 145. The use of the slides 220 may depend on the height of the mezzanine 210 above the lower floor 205.

In FIG. 2, the drones 125 also deposit packages into the same chutes 215 and containers 145 used by the drive units 130. As shown, the drone 125A has just released a package into the chute 215A. This package travels down the slide 220 and into the container 145 just like packages that are ejected into the chute 215 by the drive units 130. In addition, the chutes 215 contain respective guides 225 which help to ensure packages dropped by the drones 125 end up in the chute. For example, the size of the guides 225 may be larger than the size of the chutes 215 which make it easier for the drones 125 to accurately release packages onto the guides 225, especially for lightweight objects (e.g., envelopes) which might not drop straight down when released by a drone 125. Moreover, aiming for the guides 225 may mean the drones 125 can release packages 150 from higher altitudes, thereby keeping the drones 125 farther above the mezzanine 210. The guides 225 may be funnels or slides which direct the packages into the chute 215. Further, the guides 225 can serve as backstops when transitioning packages from the drive units 130 to the chutes 215 so the drive units 130 can eject packages 150 from multiple directions. If the package is ejected with a velocity that causes the packages to overshoot the chute 215, the package may instead land on the guide 225 which then urges the package into the chute 215 and onto the slide 220.

The warehouse 200 uses a multi-story loading area (or stacked loading area) for loading packages onto the drive units 130 and the drones 125. In this example, the ground loader 115 is on the same plane as the mezzanine 210 so that the drive units 130 can move seamlessly between the mezzanine 210 and the ground loader 115 to receive packages or to charge. The ground loader 115 is connected to the conveyor 105B to receive packages from the leading sorter, which is not shown in FIG. 2. The air loader 120, in contrast, is stacked above the ground loader 115 so that the air loader 120 is above the mezzanine 210. Raising the air load 120 permits the drones 125 to retrieve the packages without worrying about interference with the drive units 130. Like the ground loader 115, the air loader 120 is connected to the leading sorter 110 using the conveyor 105C.

In one embodiment, the airspace above the mezzanine 210 can be divided into different layers for air traffic. For example, a lower level (or slice) of the airspace may be used by the drones 125 to transport packages from the air loader 120 to the chutes 215. After depositing a package, the drones 125 may move to a upper level of the airspace that is above the lower level to move back towards the air loader 120. Because the drones 125 are now unladen, moving to an upper level requires less power, and thus, using an upper level as the "return" level may be more power efficient. That way, the airspace can be divided into levels used by the drones 125 which can reduce congestion and improve throughput of the sortation system. In other embodiments, the airspace may be divided into more than two levels where each level has a designated purpose. For example, one level may be used by laden drones 125 to deliver packages to one half of the chutes 215 or containers 145, a second level used by laden drones 125 to deliver packages to the other half of the chutes 215 or containers 145, and a third level is used by unladen drones 125 returning to the air loader 120.

In one embodiment, the drones 125 can be equipped with a bumper ring or other expansion apparatus that is larger than the openings formed by the chutes 215 so that faulted drones 125 do not fall down into the chutes 215.

In FIG. 2, the chutes 215 and containers 145 are shared by the drones 125 and the drive units 130. However, this is not a requirement, and instead some of the chutes 215 may be used by drive units 130 while other chutes 215 are used by the drones 125. Further, although not shown, separate drive units may be used on the lower floor 205 to switch out full containers 145 with new containers.

Figure 3:
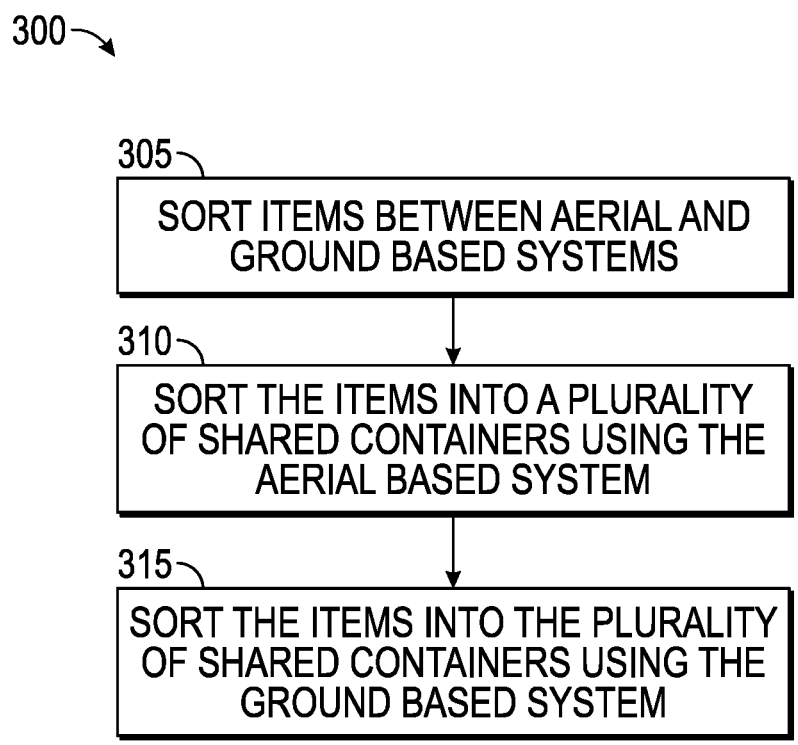
FIG. 3 is a flowchart for sorting items using containers shared by aerial and ground sortation systems, according to one embodiment described herein.

FIG. 3 is a flowchart of a method 300 for sorting items using containers shared by aerial and ground sortation systems, according to one embodiment described herein. In one embodiment, the method 300 is performed in the combined aerial and ground sortation system illustrated in FIG. 2. At block 305, a leading sorter sorts items between aerial and ground based sortation systems. The leading sort can consider physical properties of the items such as weight, size, shape, texture, aerodynamic properties, and the like to determine whether the item is better suited to being sorted by the aerial sortation system or the ground sortation system. The various structures and arrangements of the leading sorter is described in more detail in FIG. 1.

At block 310, the aerial based sortation system sorts the items into a plurality of shared containers. The aerial sortation system includes an air loader for loading packages onto the drones using, e.g., fasteners, clips, clasps, baskets, hangers, etc. These holding elements are controllable by the drone so that when the drone arrives at the destination container for the item, the drone can release the holding element so the item is deposited into the container.

In one embodiment, the drones include a battery or a super capacitor for powering the drone. While batteries can hold much higher charges than a super capacitor which can sustain powered flight for longer, they are also much heavier. If a drone makes short trips (with low weight items) before returning to the air loader, it may be more efficient to use super capacitors which are recharged more frequently (e.g., each time the drone returns to the air loader to retrieve a new package). However, if a drone makes long trips (or delivers multiple packages before returning to the air loader) or carries heavier items, a battery may be preferred. Further, the drones may be charged at the same time new packages are being loaded onto the drones.

At block 315, the ground based sortation system sorts the items into the plurality of shared containers. That is, the drive units, conveyors, or human operated apparatuses implemented in the ground sortation system can use the same containers to sort items as the aerial sortation system. Referring to FIG. 2, both the drive units 130 and the drones 125 use the same chutes 215 to deposit packages into the containers 145. Thus, if the warehouse 200 already includes the ground sortation system comprising the ground loader 115, the drive units 130, and the mezzanine 210, the air loader 120 and the drones 125 could be added without having a significant or any impact on the ground sortation system. In fact, the aerial and ground sortation systems could act independent of each other. That is, the control system for the ground sortation system can instruct the drive units 130 to sort packages into the shared containers 145 without having to communicate with (or coordinate with) the control system of the aerial sortation system. The drive units 130 and the drones 125 can sort the packages in parallel without having to coordinate their actions.

However, in other embodiments, the aerial and ground sortation system can coordinate some actions. For example, if the drive unit 130C and the drone 125A both attempt to deposit packages into the chute 215A at the same time, the packages may be stuck, or one package may knock the other package onto the mezzanine so it does not fall through the chute 215A. In that case, the control system may communicate so that the drone 125A or the drive unit 130C waits for the other vehicle to deposit its package first. Thus, some coordination or communication between the aerial and ground sortation systems may be desired.

Figure 4:
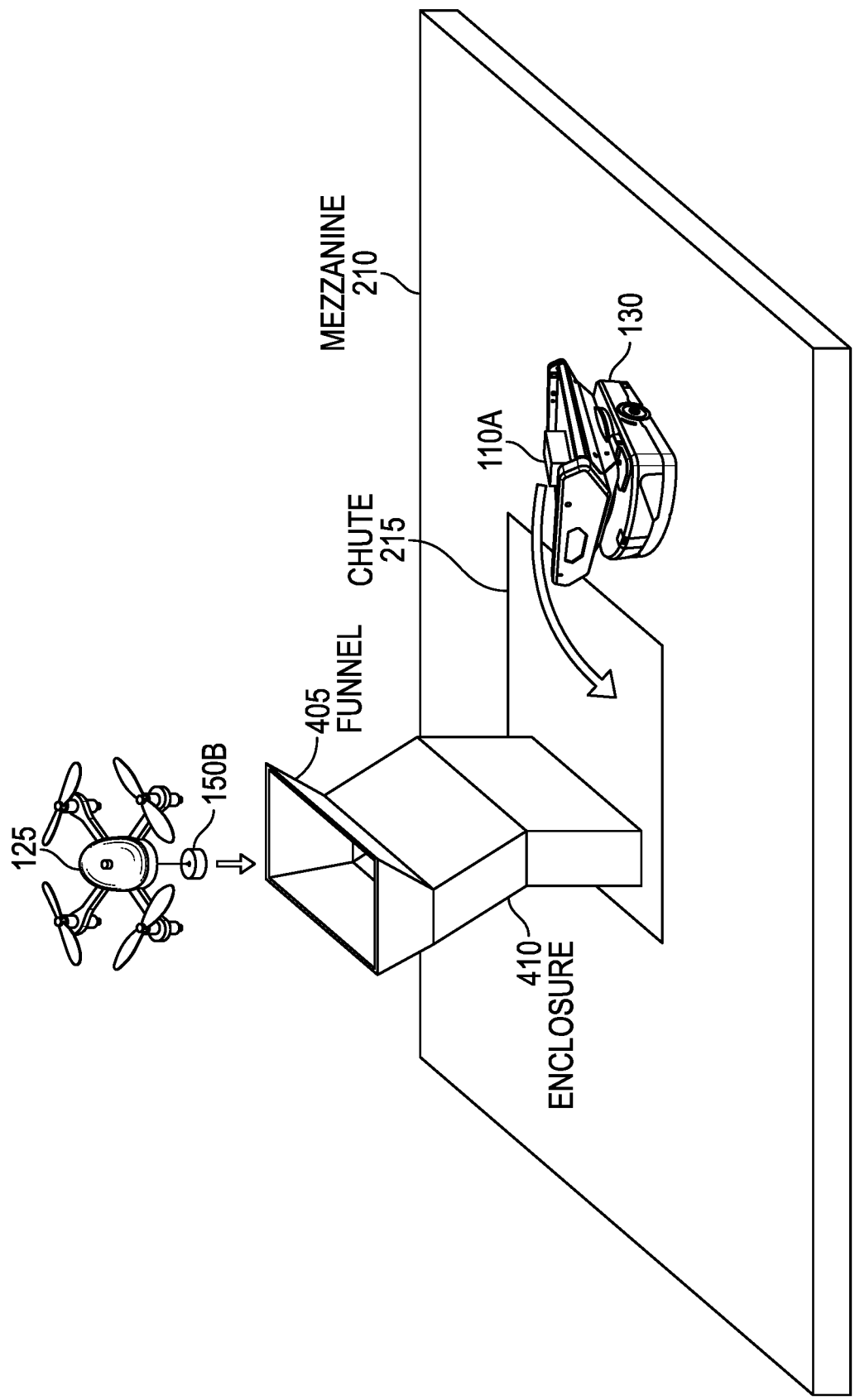
FIG. 4 illustrates a chute shared by aerial and ground sortation systems, according to one embodiment described herein.

FIG. 4 illustrates a chute 215 shared by aerial and ground sortation systems, according to one embodiment described herein. In one embodiment, FIG. 4 illustrates one of the chutes 215 which may be used in the mezzanine 210 illustrated in FIG. 2. As shown, the chute 215 defines an aperture through which packages 150 can be deposited by the drones 125 in the aerial sortation system and the drive units 130 in the ground sortation system.

In this example, FIG. 4 includes an enclosure 410 with a first end that terminates (or connects to) a funnel 405 and a second end that terminates in the chute 215. The funnel 405 provides a receptacle for receiving packages that are dropped by the drones 125. That is, to deposit the package 150B into the chute 215, the drone 125 moves so that it is above the funnel 405. In one embodiment, the funnel 405 may be a larger opening than the chute 215. Even if the funnel 405 is smaller than the chute 215, the funnel 405 is still advantageous since the sortation system does not need to worry about the drive unit 130 ejecting the package 150A into the chute 215 at the same time as the drone 125 drops the package 150B. Instead, the aerial sortation system can use the funnel 405 to deposit packages into the chute 215 while at the same time the ground sortation system uses the portion of the chute 215 not occupied by the enclosure 410. Doing so may reduce or eliminate coordination between the two systems—i.e., the systems can operate independent of each other.

Further, the funnel 405 may have perforation or holes to increase the airflow through the funnel as the drone flies above it. That is, the funnel 405 can have high porosity to reduce turbulent airflow caused by a drone flying over the funnel 405. For example, the surface can have holes large enough to reduce turbulence, but small enough to prevent packages 150 from slipping through the holes rather than being directed into the enclosure 410. Moreover, adding perforation to a surface to reduce turbulence can be applied to other surfaces in the warehouse which interact with the drones 125 such as surfaces at the air loader, charging station, home station, and the like.

In one embodiment, the funnel 405 (or the guides 225 in FIG. 2) is designed to cushion packages that are released from the drones. The surface of the funnel 405 may be soft or be supported by springs or shock absorbers that enable the surface of the funnel 405 to give as the packages 150 land. In another example, the funnel 405 can include a positive air system that pushes air up through holes in the surface where the packages land to create an air cushion above the surface that can reduce the velocity of the packages 150 before they land on the funnel 405 (or the guide 225).

Packages 150 deposited into the funnel 405 are guided into the enclosure 410 which, in this embodiment, is an annular (e.g., rectangular) shape that is angled or vertical so that packages are directed from the funnel 405 to the chute 215. While the enclosure 410 does not need to be enclosed on all sides, doing so may mitigate the risk that a package falls off the enclosure 410 before reaching the chute 215. In other embodiments, the enclosure 410 may be a slide attached the funnel 405 which has a sliding surface with side walls, but with no top.

Figure 5:
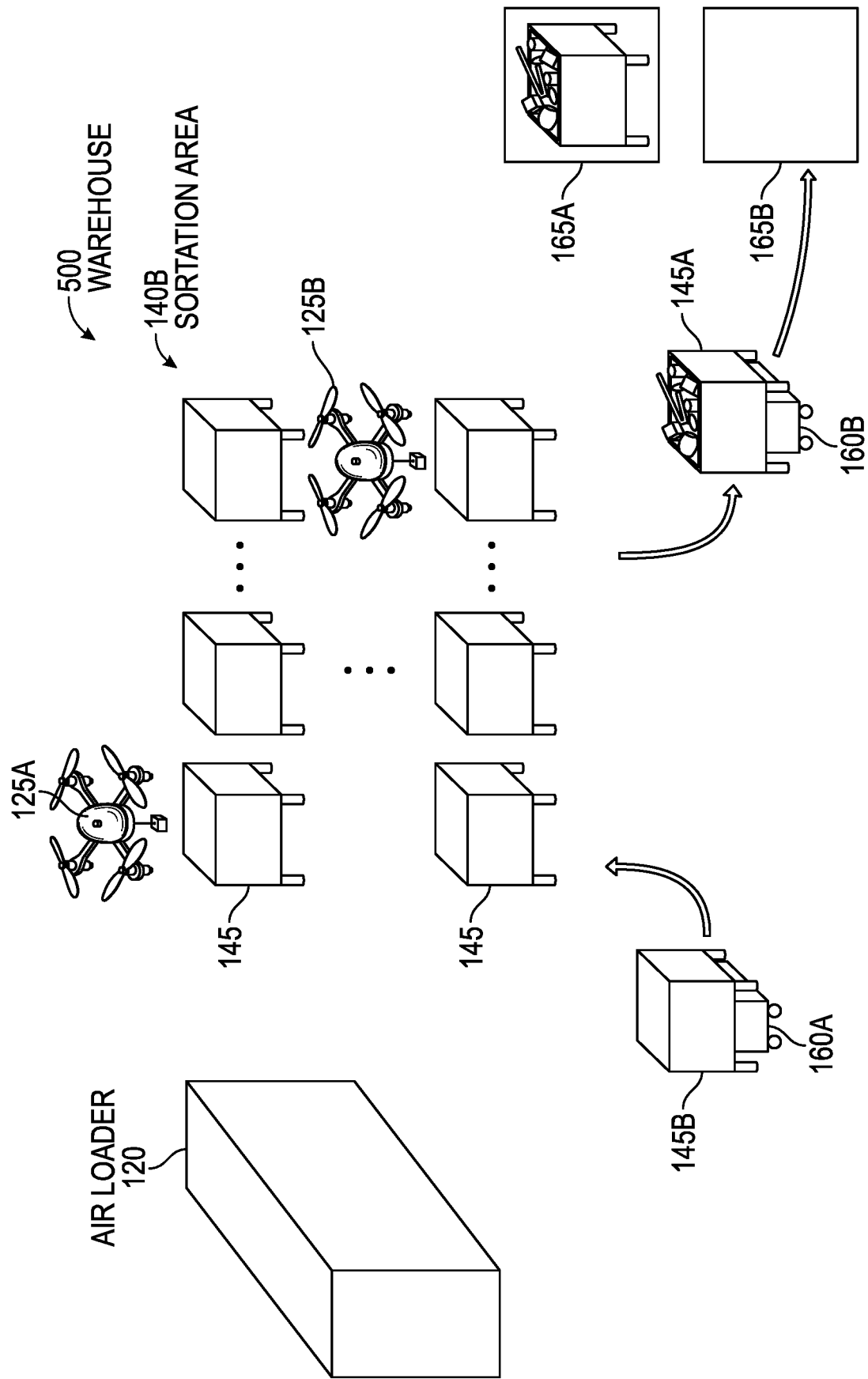
FIG. 5 illustrates a combined aerial and ground sortation system, according to one embodiment described herein.

FIG. 5 illustrates a combined aerial and ground sortation system, according to one embodiment described herein. FIG. 5 illustrates a warehouse 100 that includes an air loader 120 for inducting and loading packages onto the drones 125. In this embodiment, the aerial sortation system is solely responsible for sorting received packages into the containers 145. That is, unlike in FIG. 2 where drive units and drones both sort packages into the containers 145, in FIG. 5 only the drones 125 sort packages into the containers 145. Put differently, the drones 125 perform a primary sort based on the intermediate or final destination of the packages.

When a container 145 is full or it is time to deliver the packages (even if the container 145 is not full), the ground sortation system can instruct a drive unit 160 to retrieve the container 145 from the sortation area 140. As shown in FIG. 5, the drive unit 160B has retrieved the container 145A and is moving the container 145A to the docking station 165B. There, the container 145 can be loaded into a truck or the packages may be removed so they can be moved to a different warehouse or delivered to customers. In this manner, the drive units 160 perform a secondary sort where containers 145 are moved to a docking station 165 that corresponds to the destination of the packages in the containers. That is, each container may hold packages that have the same destination (e.g., same zip code, neighborhood, delivery route, destination warehouse, etc.). The drive units 160 sort the container 145 by moving it to another location in the warehouse 500 that corresponds to the destination of the packages in the container.

FIG. 5 also illustrates the drive unit 160A moving an empty container 145B into the sortation area 140 to, e.g., replace the container 145A which was removed. In this example, the containers 145 are specialized containers that can be lifted and moved by the drive units 160 so that drive units 160 can continue to remove and add containers 145 in the sortation area 140. For example, the containers 145 may include legs through which the drive units 160 can move until they are directly underneath the containers 145. The drive units 160 can then raise a platform to lift the legs off the ground so that the containers 145 can be moved out of the sortation area 140. However, this is just one non-limiting technique that can be used to perform the secondary sort.

The drive units 160 can also rearrange the containers so that more popular, or more frequently used containers, are moved to locations in the sortation area that are closer to the air loader. For example, the drones may sort twice as many packages for a first zip code than a second zip code. If the container for the second zip code is closer to the air loader, the drive units 160 may swap the two containers so that the container for the first zip code is closer to the air loader. This reduces the overall flight time of the drones which can mean they recharge less and also increases overall throughput in the warehouse.

Figure 6:
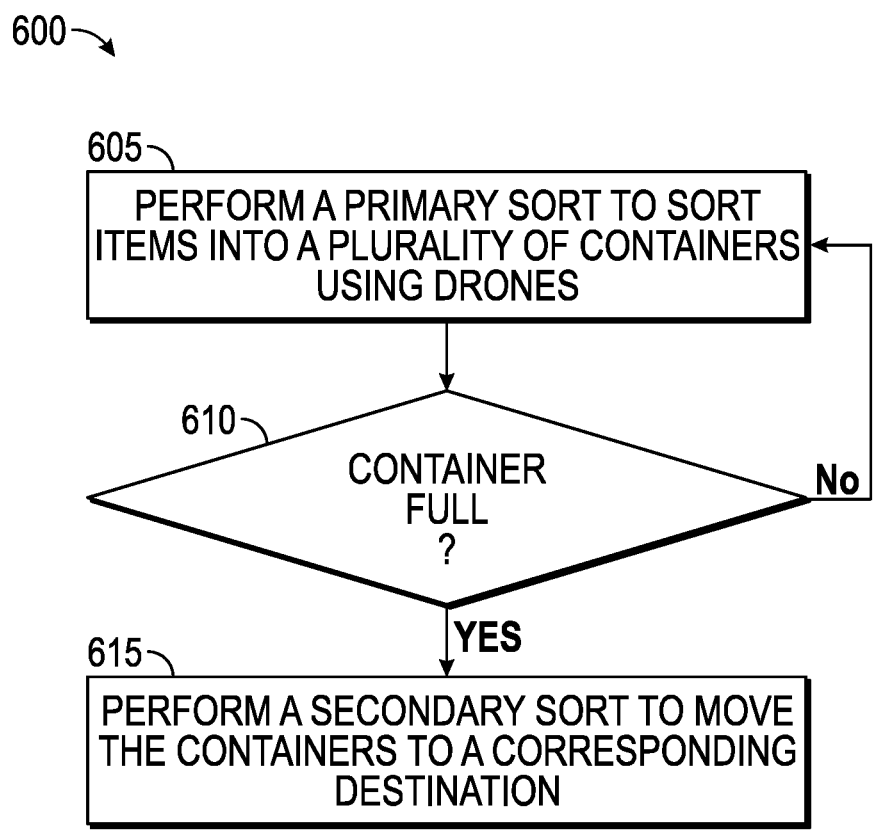
FIG. 6 is a flowchart for performing different sorts using aerial and ground sortation systems, according to one embodiment described herein.

FIG. 6 is a flowchart of a method 600 for performing different sorts using aerial and ground sortation systems, according to one embodiment described herein. At block 605, the aerial sortation system performs a primary sort to sort items into a plurality of containers using drones. In one embodiment, the aerial sortation system uses drones to sort packages between an induct station (e.g., an air loader) to a sortation area that can include a plurality of containers or receptacles.

At block 610, the combined aerial and ground sortation systems determines whether a container is full (or if it is time for a container to be delivered). For example, the sortation system may determine whether a container is full based on summing the total volume of the packages placed in the container. In another example, the warehouse may include an overhead vision system to captures images of the container, or use cameras mounted on the underside of the drones, to determine when a container is full. If so, the method 600 proceeds to block 615 where the ground sortation system performs a secondary sort to move the container to a corresponding destination (e.g., a shared destination of the packages in container). The ground sortation system can use autonomous vehicles such as the drive units 160 in FIG. 5 to move the containers, or instruct associates to move the containers using, e.g., hand trucks or forklifts. In addition to removing the containers, the ground sortation system can ensure new containers are moved into the sortation area.

Because the aerial sortation system relies on the ground sortation system to move out containers ready to be delivered and replace them with new containers, the two sortation systems may communicate. For example, the control system for the ground sortation system may determine when a container is full or needs to be delivered. This control system can instruct the aerial sortation system to temporarily stop sorting packages to the container. This provides the ground sortation system time to move the full container out of the sortation area and replace it with an empty container. Once done, the ground sortation system can inform the aerial sortation system it can begin sorting packages into the container.

Figure 7:
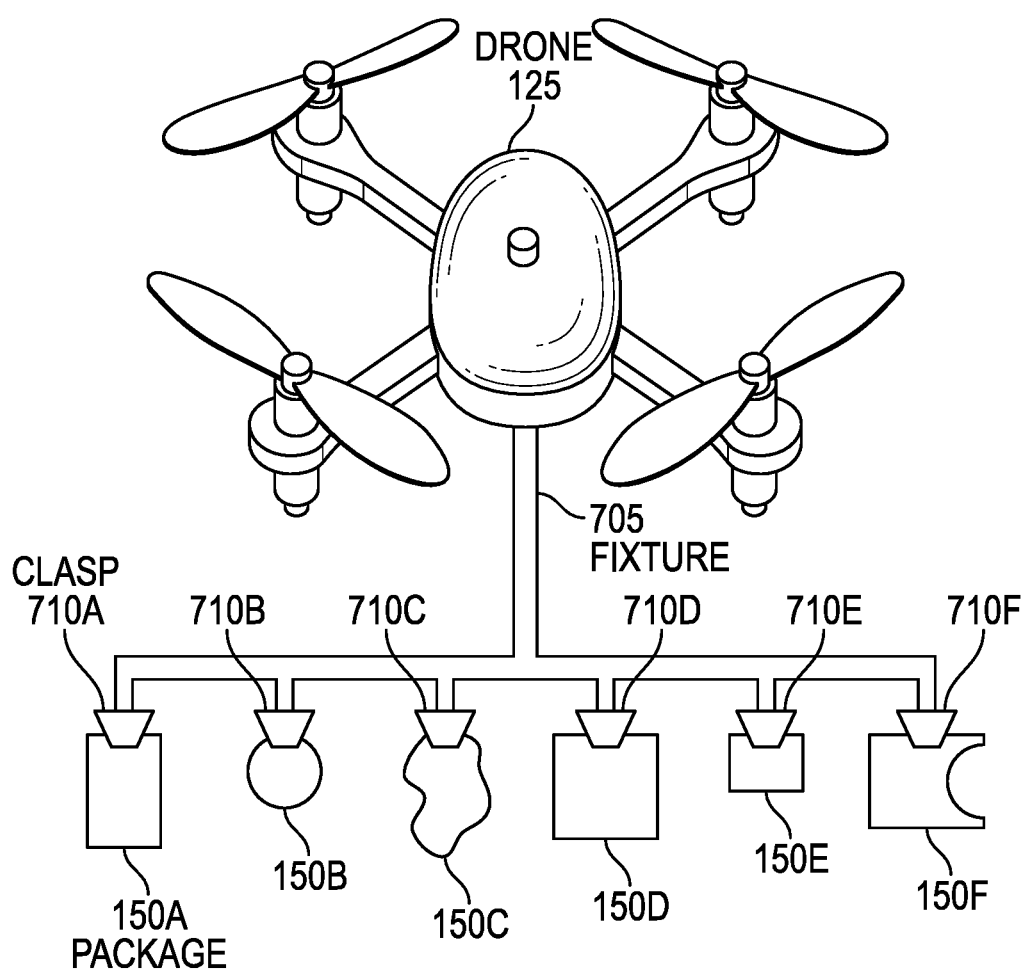
FIG. 7 illustrates a fixture for transporting multiple packages using a drone, according to one embodiment described herein.

FIG. 7 illustrates a fixture 705 for transporting multiple packages 150 using a drone 125, according to one embodiment described herein. As shown, the fixture 705 (e.g., a hanging apparatus) has at least one attachment point to the drone 125, but may be attached to the drone 125 at multiple attachment points. The fixture 705 also includes multiple clasps 710A-F that can hold the packages 150A-F. In one embodiment, the clasps 710 are individually controllable by the drone 125. That is, when the drone 125 determines it is over a location (e.g., a container) where the package 150A should be deposited, the drone 125 can release the clasp 710A while keeping the other clasps 710B-F engaged so that only the package 150A is released.

Further, to improve weight distribution, the drone 125 may deliver the packages 150A-F in a manner so that the drone 125 does not become unbalanced. For example, the drone 125 may first deliver the package 150A, then the package 150F, then the package 150B, then the package 150E, and so forth. Doing so may improve the charge life of the drone 125 and help it maintain a steady flight pattern.

In one embodiment, the packages 150 may be loaded according to weight. For example, lighter packages may be attached at the ends (e.g., to clasps 710A and 710F) while heavier packages are attached closer to the middle (e.g., clasps 710C and 710D). In addition to considering weight, the packages 150 may be attached to the clasps 710 based on aerodynamic properties of the packages 150. For example, the packages 150 may be arranged so that a skinner side is facing the direction the drone travels to reduce air resistance.

When depositing the packages 150 onto a target (e.g., a container, guide, or funnel), the drone 125 may consider the location of the package 150 relative to the target. For example, if the drone 125 is going to release the package 150A into a container, rather than centering the drone 125 above the center of the container, the drone 125 instead centers the location of the package 150A (which is offset from the center of the drone 125) over the center of the container. Thus, the drone 125 can consider the locations of the packages 150 on the fixture 705 to align the packages 150 with the target.

In one embodiment, the same machine that packages items to form the packages 150 also attaches the packages 150 onto the feature. That is, rather than an air loader receiving individual items that then are attached to the drone 125, the air loader may receive the fixture 705 which already has the packages 150 pre-loaded. The air loader then attaches the fixture 705 to the drone 125. For example, the same machines used enclose and seal items into padded envelopes may be outfitted to attach the padded envelopes to the fixture 705. These fixtures 705 can then be transported to the air loader which attaches the fixtures 705 to the drones 125 for delivery.

When performing a multi-package mission, the charge of the drone's power source may fall below a safety threshold before the drone 125 has delivered all the packages 150. In that case, the drone 125 may return to a charging station to recharge while still being laden with packages. In one embodiment, the charging station removes the undelivered packages and returns them to the air loader where they can be loaded onto another drone for delivery. Alternatively, the drone may keep the packages while being charged. For example, if charging takes only a few seconds or minutes (e.g., to charge a high capacitance capacitor), it may be more efficient to leave the packages attached to the charging drone which can then finish the mission once charged. Moreover, in another embodiment, the drone performing a multi-package mission may recharge during the mission. For example, the warehouse may include charging stations in the sortation area which the drones can use as waystations to charge during multi-package missions.

Figure 8:
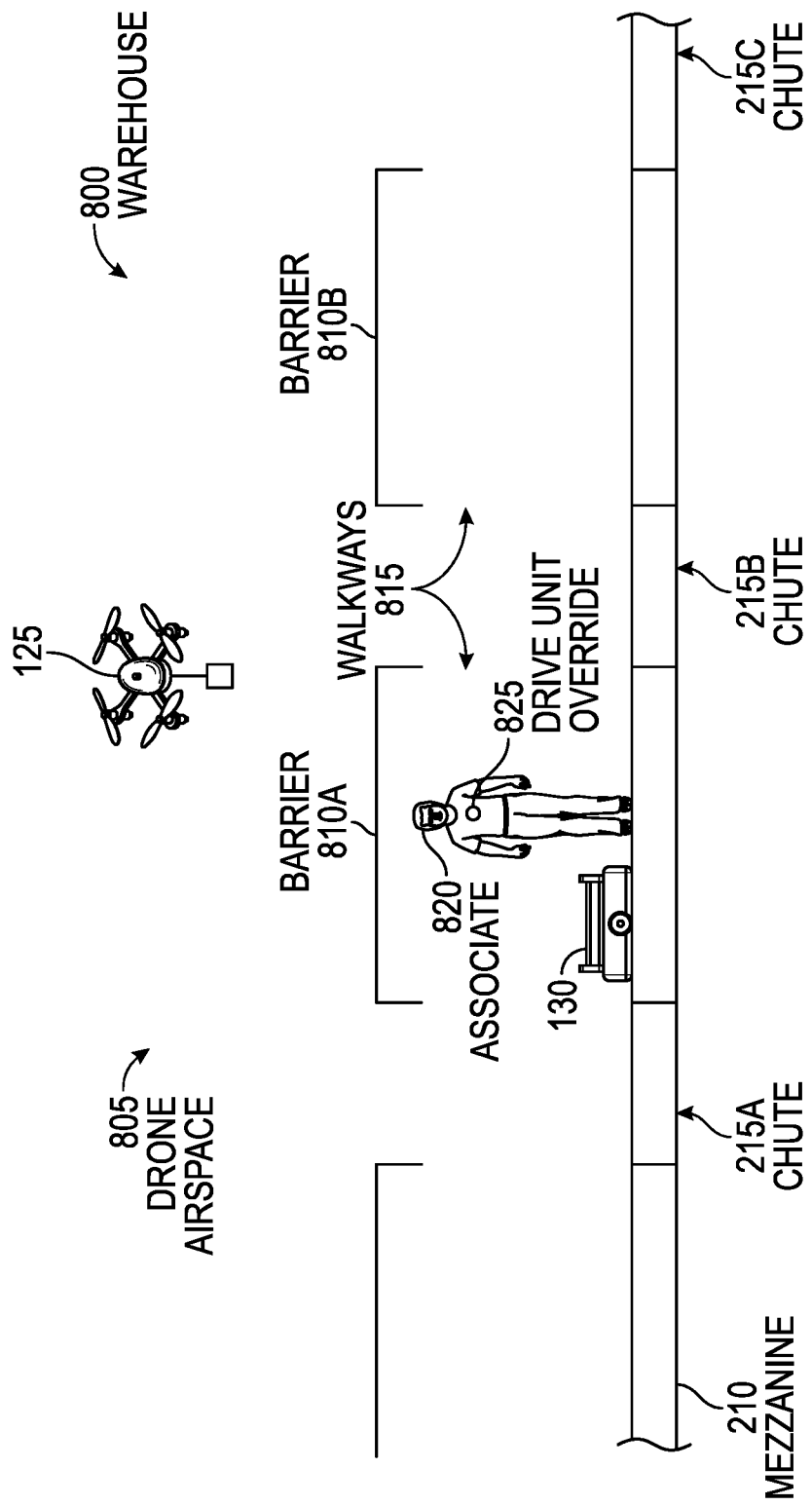
FIG. 8 illustrates a safety system for a combined aerial and ground sortation system, according to one embodiment described herein.

FIG. 8 illustrates a safety system in a warehouse 800 for a combined aerial and ground sortation system, according to one embodiment described herein. The safety system includes overhead barriers 810A and 810B (e.g., chain linked fences) that are raised above the mezzanine 210 to form walkways 815 for an associate 820. The overhead barriers 810 can protect the associate 820 from anything that may fall from the drone airspace 805. Thus, an associate 820 can move in the walkways 815 to perform maintenance such as fixing faulty drive units 130 or drones 125, or collect packages that might have not fallen in the chutes 215.

Because the warehouse 800 also includes the drive units 130 which may move in the walkways 815 when sorting packages into the chutes 215, the safety system also includes drive unit overrides 825 (e.g., override devices) that can be worn by the associate 820. The drive unit overrides 825 can emit wireless signals (e.g., RF signals limited to a short distance such as 5-20 meters) that when received by the drive units 130 instruct the drive units 130 to perform a safety protocol such as moving in a direction away from the associate 820 or to stop moving until the drive unit override 825 is no longer in wireless range (e.g., the associate 820 has moved away from the region around the drive unit 130. In addition to causing the drive units 130 to enter into a safety protocol, the drive unit override 825 can also emit RF signals that override the mission of the drones 125 to cause them to perform a safety protocol. For example, if a drone 125 receives the RF signals, it may move a predetermined distance away from the associate 820 or move to a predetermined altitude and remain stationary until the RF signal is no longer received (or until its battery/super capacitor level falls below a certain level which forces the drone to return to a charging station).

In one embodiment, the RF signals emitted by the override 825 are different depending on whether the associate is interacting with the ground sortation system or the aerial sortation system. If the associate is in a space used by the ground sortation system, the override 825 emits RF signals in a first mode that cause the drive units 130 to perform a safety protocol but any drones 125 within wireless range continue to operate as normal. That is, the drones 125 ignore the RF signal. Conversely, if the associate is in a space used by the drones 125, the override 825 may emit RF signals in a second mode that instruct the drones 125 to perform the safety protocol while any drive units 130 receiving those signals can continue to operate normally. Further, the override 825 can operate in a third mode where the emitted RF signals cause both drones 125 and drive units 130 in wireless range to perform a safety protocol.

The safety system could also include no fly zones in the drone airspace 805 to prevent the drones 125 from ever flying into specific areas in the warehouse 800 such as a HVAC duct or flying outside a predefined drone area.

The safety system may also include sound isolation to protect associates 820 from noise generated by flying large numbers of drones 125 in a sortation area. In addition to wearing personal sound dampening equipment, the barriers 810 and the surface of the mezzanine may include sound dampening material. In yet another embodiment, the air loader can include sound dampening equipment and material. For example, associates may be tasked with attaching a package (or packages) onto a drone. As such, the associates may be exposed to significant drone noise. Sound dampening material may mitigate this noise exposure.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a plurality of items;
   determining, based on physical characteristics of the plurality of items, a first subset of the plurality of items to sort using drones in an aerial sortation system and a second subset of the plurality of items to sort using drive units in a ground sortation system;
   sorting, using the drones, the first subset of the plurality of items into a plurality of shared containers; and
   sorting, using the drive units, the second subset of the plurality of items into the plurality of shared containers, wherein the first and second subset of the plurality of items are sorted based on a destination of the plurality of items, wherein the items in each container of the plurality of shared containers have a common destination,
   wherein the plurality of shared containers are recessed below a mezzanine, wherein the drive units traverse the mezzanine to eject the second subset of the plurality of items through chutes corresponding to the plurality of shared containers, and wherein the drones navigate an air space above the mezzanine.

2. The method of claim 1, further comprising:
   loading the second subset of the plurality of items onto the drive units at a ground loader disposed at a same level as the mezzanine.

3. The method of claim 2, further comprising:
   loading the first subset of the plurality of items onto the drones at an air loader disposed at a greater height from a ground floor than the mezzanine and the ground loader.

4. The method of claim 3, further comprising:
   charging capacitors in the drones at the air loader while loading the first subset of the plurality of items onto the drones.

5. A method, comprising:
   sorting, using drones in an aerial sortation system, a first plurality of items into a plurality of containers based on destinations corresponding to the first plurality of items, wherein sorting the first plurality of items further comprises:
      navigating laden drones in a first level of an airspace to deposit the first plurality of items into the plurality of containers, and
      navigating unladen drones in a second level of the airspace different from the first level; and
   sorting, using a ground sortation system, at least one of (i) a second plurality of items into the plurality of containers based on destinations corresponding to the second plurality of items or (ii) the plurality of containers, wherein items in each container of the plurality of containers have a common destination.

6. The method of claim 5, wherein a fixture holding multiple ones of the first plurality of items is attached to at least one of the drones, wherein sorting the first plurality of items further comprises:
navigating the at least one drone to multiple ones of the plurality of containers, wherein the fixture releases at least one of the multiple ones of the first plurality of items into each of the multiple ones of the plurality of containers.

7. The method of claim 5, further comprising:
performing an initial sort to determine that the first plurality of items should be delivered using the aerial sortation system and the second plurality of items should be delivered using the ground sortation system, wherein the initial sort is based on physical characteristics of the first and second plurality of items.

8. The method of claim 5, wherein sorting, using the ground sortation system, the plurality of containers comprises:
moving a full container of the plurality of containers to a docking station corresponding to a shared destination of items in the full container; and
moving an empty container to replace the full container in a sortation area.

9. A warehouse, comprising:
an aerial sortation system comprising drones;
a ground sortation system;
a plurality of containers in a sortation area, wherein the drones are configured to sort a first plurality of items into the plurality of containers based on destinations corresponding to the first plurality of items and the ground sortation system is configured to at least one of (i) sort a second plurality of items into the plurality of containers based on destinations corresponding to the second plurality of items or (ii) sort the plurality of containers; and
autonomous drive units in the ground sortation system, wherein, after determining one of the plurality of containers is full, a first one of the autonomous drive units is configured to move the full container to a docking station, wherein a second one of the autonomous drive units is configured to move an empty container into a position previously occupied by the full container.

10. The warehouse of claim 9, further comprising:
a mezzanine comprising a plurality of chutes, wherein each of the chutes corresponds to a respective one of the plurality of containers, wherein the drones sort the first plurality of items into the plurality of chutes and drive units of the ground sortation system sort the second plurality of items into the plurality of chutes.

11. The system of claim 10, further comprising:
guides disposed at the plurality of chutes, wherein the guides are configured to guide the first plurality of items released by the drones, and the second plurality of items ejected by the drive units, into the plurality of chutes.

12. The system of claim 10, further comprising:
a funnel disposed above each of the plurality of chutes; and
an enclosure connected to each of the funnels, wherein the drones are configured to release the first plurality of items into the funnels, and the enclosures guide the first plurality of items into the plurality of chutes.

13. The system of claim 10, further comprising:
a slide arranged below each of the plurality of chutes, wherein the plurality of containers are arranged below the slides.

14. The system of claim 9, wherein the plurality of containers are raised so that the autonomous drive units can move underneath the plurality of containers in order to lift and move the plurality of containers.

15. The system of claim 9, further comprising:
overhead barriers arranged to provide safety walkways for a human moving in the warehouse to provide protection to the human from any objects corresponding to the aerial sortation system.

16. The system of claim 15, further comprising:
an override device configured to be worn by the human, wherein the override device is configured to emit wireless signals to instruct the drones that are proximate to the human to perform a first safety protocol.

17. The system of claim 16, wherein the wireless signals instruct drive units corresponding to the ground sortation system that are proximate to the human to perform second safety protocol.

* * * * *